United States Patent [19]

Cambonie et al.

[11] Patent Number: 4,872,134
[45] Date of Patent: Oct. 3, 1989

[54] SIGNAL PROCESSING INTEGRATED CIRCUIT FOR ROW AND COLUMN ADDITION OF MATRICES OF DIGITAL VALUES

[75] Inventors: Joel Cambonie, Fontaine; Alain Artieri, Meylan, both of France

[73] Assignee: SGS Thomson Microelectronics S.A., Paris, France

[21] Appl. No.: 135,270

[22] Filed: Dec. 21, 1987

[30] Foreign Application Priority Data

Dec. 22, 1986 [FR] France ................................ 86 17937

[51] Int. Cl.$^4$ .............................................. G06F 7/52
[52] U.S. Cl. ..................................... 364/768; 364/758
[58] Field of Search ........... 364/754, 757, 758, 724.11, 364/724.12, 728.01, 728.03, 715.01, 768, 736

[56] References Cited

U.S. PATENT DOCUMENTS 4,044,243 8/1977 Cooper et al. ...................... 364/754
4,573,136 2/1986 Rossiter ............................. 364/757

FOREIGN PATENT DOCUMENTS 2082016 2/1982 United Kingdom .

Primary Examiner—Gary V. Harkcom
Assistant Examiner—Long T. Nguyen
Attorney, Agent, or Firm—Oblon, Spivak, McClelland, Maier & Neustadt

[57] ABSTRACT

A signal-processing circuit performs a cosine type transformation (double addition in rows and columns) of values of a matrix of n rows and n columns. An architecture is proposed with a row transform circuit, a column transform circuit and a buffer memory of nxn words. The memory is addressed sequentially, line by line, during the storage of nxn coefficients $C^i(v)$ which are the results of the row transform on a block of nxn data. Then it is addressed sequentially, column by column, during the storage of nxn coefficients $C^i(v)$ corresponding to the processing of the following block. At each address, a read stage of a coefficient is performed followed by the writing of a new coefficient. The invention can be applied to circuits for the digital processing of images to prepare the compression of data before transmission.

4 Claims, 2 Drawing Sheets

SIGNAL PROCESSING INTEGRATED CIRCUIT FOR ROW AND COLUMN ADDITION OF MATRICES OF DIGITAL VALUES

BACKGROUND OF THE INVENTION

1. Field of the Invention

The invention pertains to the architecture of integrated circuits that perform a special type of signal digital processing operation. More precisely, the digital processing considered herein is a double weighted addition, in rows and then in columns, of digital values $x(i,j)$ of a matrix of $n \times n$ digital values.

With coefficients $x(i, j)$, where i is a row index of the matrix and j is a column index, it is sought to produce a matrix of coefficients $C(u,v)$ where u is a row index and v is a column index with:

$$C(u,v) = \sum_{i=0}^{i=n-1} C^i(v) g(i,u)$$

with $$C^i(v) = \sum_{j=0}^{j=n-1} x(i,j) f(j,v)$$

Using input electrical signals representing the digital values $x(i,j)$, nxn signals representing coefficients $C^i(v)$ are produced at first. Each coefficient $C^i(v)$ represents a weighted addition of the values $x(i,j)$ of the row i assigned coefficients $f(j,v)$; v represents a column index varying from 0 to $n-1$ and there are n coefficients $C^i(v)$ for each row with an index i. This operation is called row transformation.

Using the nxn signals representing the coefficients $C^i(v)$, nxn signals representing the coefficients $C(u,v)$ are produced. Each coefficient $C(u,v)$ is a weighted addition of the values $C^i(v)$ of the column v assigned coefficients $g(i,u)$; u represents a row index varying from 0 to $n-1$ and n coefficients $C(u,v)$ are produced for each column with an index v. This operation is the column transformation.

This type of digital processing is encountered especially when making so-called cosine transformations where the coefficients $f(j,v)$ and $g(i,u)$ have the form cos $(2i+1)$ u$\pi$/2n: these transformations are useful for facilitating the compression of data in digital transmissions of signals, and especially for the digital transmission of images.

2. Description of the Prior Art

The architectures of integrated circuited circuits used to make this type of transformation are relatively complicated because they have to enable real-time processing, i.e. the transfer rate of the digital data to be processed is imposed at the input of the circuit and the transfer rate of the processed data at the output should be as fast as the transfer rate at the input. Of course, this transfer rate is high: for example, for the digital transmission of images, it is sought to be able to process a block of 16×16 digital values (256 pixels) in less than 20 microseconds since successive blocks of 256 values appear at the input of the circuit with a periodicity about 20 microseconds.

FIG. 1 is a block diagram of a fairly simple integrated circuit architecture which may be devised to perform, on one and the same integrated circuit chip, the complete transformation of a block of nxn digital values $x(i,j)$ into a block of nxn coefficients $C(u,v)$.

In this diagram, there is a first operator CTL that performs the row addition, a second operator CTC that performs the column addition, two memories, MEM 1 and MEM 2, to store values representing the coefficients $C^i(v)$ and two routing switches, AIG 1 and AIG 2, to set up connection paths between, firstly, the operator CTL and the memories MEM 1 and MEM 2 and, secondly, between these memories and the operator CTC. The assembly is controlled by a sequencer SEQ.

A block of nxn data $x(i,j)$ to be processed is brought by an input bus E to the row transform operator CTL which produces nxn digital data representing nxn digital coefficients $C^i(v)$: This data is stored in the nxn addresses of the memory MEM 1 (memory of nxn words). The rate at which the blocks of nxn data are processed is, for example, one block per 20 microseconds. One datum $x(i,j)$ appears, for example, every 70 nanoseconds (for nxn=256).

To process the following block of nxn values $x(i,j)$, the circuit CTL receives the successive values $x(i,j)$ and performs the row transformation. However, this time, the sequencer SEQ controls the routing switch AIG1 so as to store the results $C^i(v)$ in the second memory MEM2. During this time, the data previously recorded in the memory MEM1 is applied in the form of input digital values to be processed, through the routing switch AIG 2, to the column transformation circuit CTC which produces the coefficients $C(u,v)$ at its output.

This process is continued: alternately, a block of nxn coefficients $C^i(v)$ is stored in one of the memories while a block of coefficients $C^i(v)$, recorded at the previous period in the other memory, is processed.

This architecture is elegant but requires two memories each capable of storing nxn data $C^i(v)$. For it must be clearly understood that, for it to be possible to perform a column transformation on the coefficients $C^i(v)$, all the coefficients $C(v)$ of one and the same column v should be memorized. Now, since these coefficients $C^i(v)$ reach the circuit CTL row by row, and not line by line, this means in practice that the column transformation can start only when all the coefficients $C^i(v)$ of the matrix have reached the circuit CTL. This is why the architecture of FIG. 1 uses two memories that work alternately. Furthermore, it must be noted that if the data $C^i(v)$ is registered in a memory row by row (i being the row index), then the said data should be read in the following period column by column (v being the column index).

SUMMARY OF THE INVENTION

The invention proposed herein makes it possible to have only one memory of nxn coefficients $C^i(v)$. It therefore, saves a large area on the integrated circuit chip.

The integrated circuit for the digital processing of signals according to the invention performs, like the circuit of FIG. 1, a transformation of nxn input signals representing a matrix of digital values $x(i,j)$ where i is a row index and j is a column index of the matrix, and it produces nxn output signals representing coefficents $C(u,v)$, by a double row and column addition, having the form:

$$C(u,v) = \sum_{i=0}^{n-1} C^i(v) \, g(i,u)$$

with $$C^i(v) = \sum_{j=0}^{n-1} x(i,j) \, f(j,v)$$

This circuit comprises:

A first adding circuit, capable of receiving the signals representing the digital values x(i,j) and of producing signals representing the coefficients $C^i(v)$;

A memory capable of recording the signals $C^i(v)$ and then restoring them, the addressing of this memory being organized in n rows and n columns;

A second adding circuit capable of receiving, in succession, the signals representing the values $C^i(v)$ and producing signals representing the values C(u,v);

A sequencer to address the memory, to give the memory successive addresses of data $C^i(v)$ to be recorded, coming from the first adding circuit, or to be restored to the second adding circuit;

Wherein the sequencer alternately gives a sequence of nxn addresses, row by row, then a sequence of nxn addresses, column by column, with a read operation followed by a write operation being performed for each address given by the sequencer.

In a preferred embodiment of the invention, the memory has two separate data buses, one to receive data from the first adding circuit and the other to give data to the second adding circuit. In this case, the write operation may begin when the read operation is not completely over.

In another embodiment, the memory has only one data input/output bus and, in this case, it must be seen to it that the entire read operation is performed before beginning a write operation at the same address.

The memory is preferably a static memory (SRAM).

BRIEF DESCRIPTION OF THE DRAWINGS

Other characteristics and advantages of the invention will emerge from the following detailed description made with reference to the appended figures, of which.

DESCRIPTION OF A PREFERRED EMBODIMENT

Figure 1:
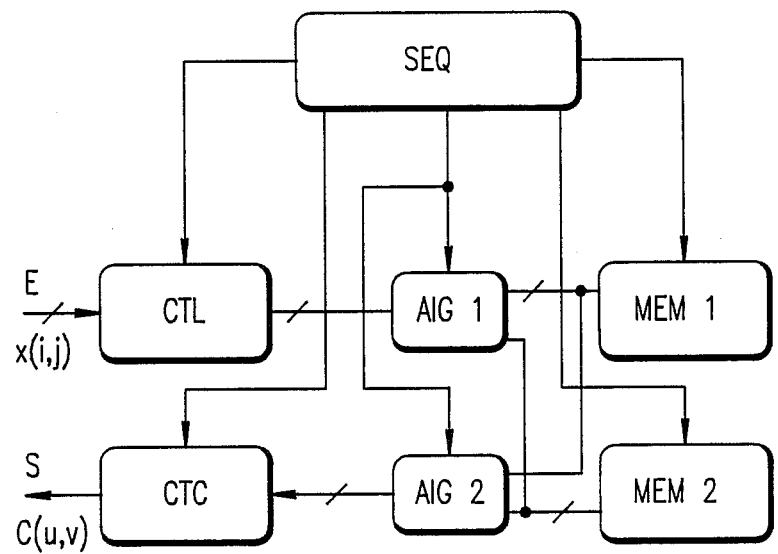
FIG. 1, already described, shows a possible architecture of a circuit performing a double addition, in rows and columns, of digital values.
Figure 2:
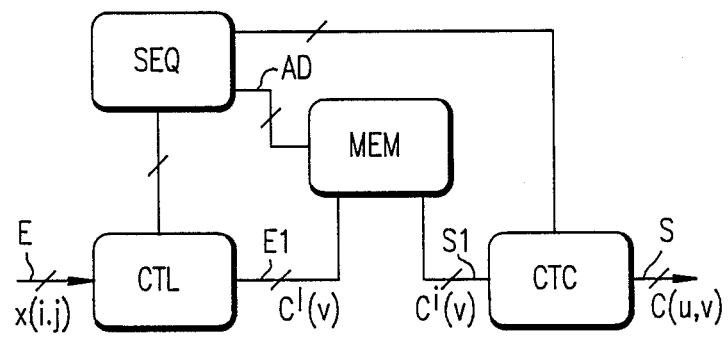
FIG. 2 shows the architecture according to the invention, used to perform the same digital processing operation.

FIG. 2 shows the circuit architecture according to the invention.

The data to be processed x(i,j) is brought successively by an input bus E. A datum arrives periodically (period T) and a block of nxn data arrives with a periodicity of $Tech = n \times n \times T.$ The data is processed in a first adding circuit CTL that performs a row transform (weighted addition of data x(i,j) of one and the same row with an index i) resulting in the production of nxn coefficients $C^i(v)$ on an internal bus E1 which connects the output of the circuit CTL to the data inputs of a memory MEM with nxn words.

The coefficients $C^i(v)$ stored in the nxn positions of the memory MEM can be restored at an output bus S1 which connects the memory to a second adding circuit CTC performing a column transform (weighted addition of the coefficients $C^i(v)$ of one and the same column with index v). This second adding circuit CTC produces coefficients C(u,v), which are the results of two-dimensional cosine transform on an output bus S.

The memory and the adding circuits are supervised by a sequencer SEQ.

This sequencer is used, in particular, to define the addressing sequences of the various positions of words of the memory M, during the storing of the coefficients $C^i(v)$ and when they are being restored.

The addresses of these positions are defined by 2k bits (with $2^2 = n$) given by the sequencer to the memory on an address bus AD.

Of these 2k bits, half (namely the k first bits) define the most significant bits of the address while the other half (also k bits) define the least significant bits of the address.

For reasons of convenience, the k most significant bits will be called row address bits and the k least significant bits will be called column address bits. This makes it possible to picture the memory as a square matrix of nxn points having the same structure as the square matrix of nxn coefficients $C^i(v)$, with each coefficient corresponding to a point. Of course, the physical structure of the memory is not necessarily square.

According to the invention, the sequencer periodically reverses the row and column address in the memory MEM, with a period Tech which is the input period of each new block of nxn data to be processed.

In other words, whereas two successive blocks of nxn data x(i,j) are processed in a strictly identical way by the circuit CTL and whereas their results $C^i(v)$ should also be processed in a strictly identical way by the circuit CTC, it is provided that the intermediate storage of the coefficients $C^i(v)$, corresponding to the first block, will be done differently from the storage of the coefficients $C^i(v)$ corresponding to the following block.

The coefficients $C^i(v)$, which reach the bus E1 in a certain order, are stored row by row in the memory if it is the first block that is being processed. They are stored column by column if it is the second block that is being processed, and so on. The process is repeated alternately, with row storage followed by column storage, although there is no change at all in the processing done by the circuit CTL and although the data x(i,j) reaches the bus E in the same order.

Thus, it may be assumed that the coefficients $C^i(v)$ arrive in the following order: $C^0(0), C^0(1), C^0(2), \ldots, C^0(n-1)$ then $C^1(0), C^1(1), \ldots, C^1(n-1)$, etc, and finally $C^{n-1}(0), C^{n-1}(1), \ldots, C^{n-1}(n-1)$.

This means that the coefficients of the first row (index i=0) of the matrix $C^i(v)$ arrive first, then those of the second row (i=1) etc., then those of the last row (i=n−1).

Let us consider the first block of coefficients processed $C^i(v)$. It will be stored in the memory using the index i (row index of the digital matrix of coefficients $C^i(v)$) as the row address of the memory, and the index v (column index of the matrix) as the column address of the memory.

But if it is the second block that arrives, at the following period Tech, the row index i will be used as the column address and the column index v will be used as the row address.

Since, in both cases, the coefficients arrive in the same order $C^0(0), C^0(1), \ldots, C^0(n-1), C^1(0), C^1(1), \ldots, C^1(n-1), \ldots, C^{n-1}(0), C^{n-1}(1), C^{n-1}(n-1)$ it is the sequencer that should modify the sequence of successive addresses given to the memory.

In a simplified example, for n=4 the processed block is the matrix of the following coefficients:

| $C^0(0)$ | $C^0(1)$ | $C^0(2)$ | $C^0(3)$ |
| $C^1(0)$ | $C^1(1)$ | $C^1(2)$ | $C^1(3)$ |
| $C^2(0)$ | $C^2(1)$ | $C^2(2)$ | $C^2(3)$ |
| $C^3(0)$ | $C^3(1)$ | $C^3(2)$ | $C^3(3)$ |

Assuming that the circuit CTL gives the results $C^i(v)$ in the order given above, the storage is done as below for the first block processed.

| Address in the memory | | Stored words |
|---|---|---|
| Most significant bits | Least significant bits | |
| 00 | 00 | $C^0(0)$ |
| 00 | 01 | $C^0(1)$ |
| 00 | 10 | $C^0(2)$ |
| 00 | 11 | $C^0(3)$ |
| 01 | 00 | $C^1(0)$ |
| 01 | 01 | $C^1(1)$ |
| 01 | 10 | $C^1(2)$ |
| 01 | 11 | $C^1(3)$ |
| 10 | 00 | $C^2(0)$ |
| 10 | 01 | $C^2(1)$ |
| 10 | 10 | $C^2(2)$ |
| 10 | 11 | $C^2(3)$ |
| 11 | 00 | $C^3(0)$ |
| 11 | 01 | $C^3(1)$ |
| 11 | 10 | $C^3(2)$ |
| 11 | 11 | $C^3(3)$ |

But for the second processed block, the storage is done in the following order:

| Address in the memory | | Stored words |
|---|---|---|
| Most significant bits | Least significant bits | |
| 00 | 00 | $C^0(0)$ |
| 01 | 00 | $C^0(1)$ |
| 10 | 00 | $C^0(2)$ |
| 11 | 00 | $C^0(3)$ |
| 00 | 01 | $C^0(0)$ |
| 01 | 01 | $C^0(1)$ |
| 10 | 01 | $C^0(2)$ |
| 11 | 01 | $C^0(3)$ |
| 00 | 10 | $C^0(0)$ |
| 01 | 10 | $C^0(1)$ |
| 10 | 10 | $C^0(2)$ |
| 11 | 10 | $C^0(3)$ |
| 00 | 11 | $C^0(0)$ |
| 01 | 11 | $C^0(1)$ |
| 10 | 11 | $C^0(2)$ |
| 11 | 11 | $C^0(3)$ |

The above table is deduced from the preceding one by permutating the least significant bit and most significant bit columns.

This amounts virtually to storing the matrix of coefficients $C^i(v)$ in the form:

| $C^0(0)$ | $C^1(0)$ | $C^2(0)$ | $C^3(0)$ |
| $C^0(1)$ | $C^1(1)$ | $C^2(1)$ | $C^3(1)$ |
| $C^0(2)$ | $C^1(2)$ | $C^2(2)$ | $C^3(2)$ |
| $C^0(3)$ | $C^1(3)$ | $C^2(3)$ | $C^3(3)$ |

The circuit works as follows:

The data x(i,j) arrives at the rate of the period T. The coefficients $C^i(v)$ are produced at the same rate and stored in the memory, also at the same rate. They are also read from this memory at the same rate and transmitted to the second adding circuit CTC which produces the coefficients C(u,v).

At each period T, defining the processing rate, the following two operations are performed:

The reading of a coefficient $C^i(v)$ contained in the memory at the address (r,s) given by the sequencer; r represents the most significant bits of the address and s represents the least significant bits. The word is transmitted to the circuit CTC by the bus S1;

Writing, at the same address, of a new coefficient $C^i(v)$ given by the circuit CTL on the bus E1.

Throughout a period Tech corresponding to a block of nxn data, the addresses (r,s) are incremented so as to perform a row-by-row storage: s is incremented with r constant, then r is incremented etc.

Throughout the following period Tech, corresponding to the processing of the following block, the addresses (r,s) are incremented so as to perform a column-by-column storage: r is incremented with s constant, then s is incremented etc.

The end result is that the second adding circuit CTC receives a sequence of coefficients transmitted column by column if they have been recorded row by row in the preceding period and vice versa.

In all cases, the result obtained is that the adding circuit processes a matrix of coefficients column by column if the said matrix has been obtained by a row-by-row addition.

This is true even if the results $C^i(v)$ of the processing by the first circuit CTL are produced and stored in an order different from the common order indicated above (with column index v increasing at i constant, then index i increasing).

The sole condition to be met is that, in principle, the row transformation circuit which gives the coefficients $C^i(v)$ row by row, should establish a row order compatible with the order in which these coefficients, once they are taken by column, must be applied to the circuit CTC. Thus, assuming that the second addition requires that the four coefficients $C^i(v)$ of the column v should arrive in a scrambled order $C^0(v), C^1(v), C^3(v), C^2(v)$, then the circuit CTL should give the coefficient $C^i(v)$ rows in the same scrambled order, i.e. the rows 0, 1, 3, 2, in succession.

Figure 3:
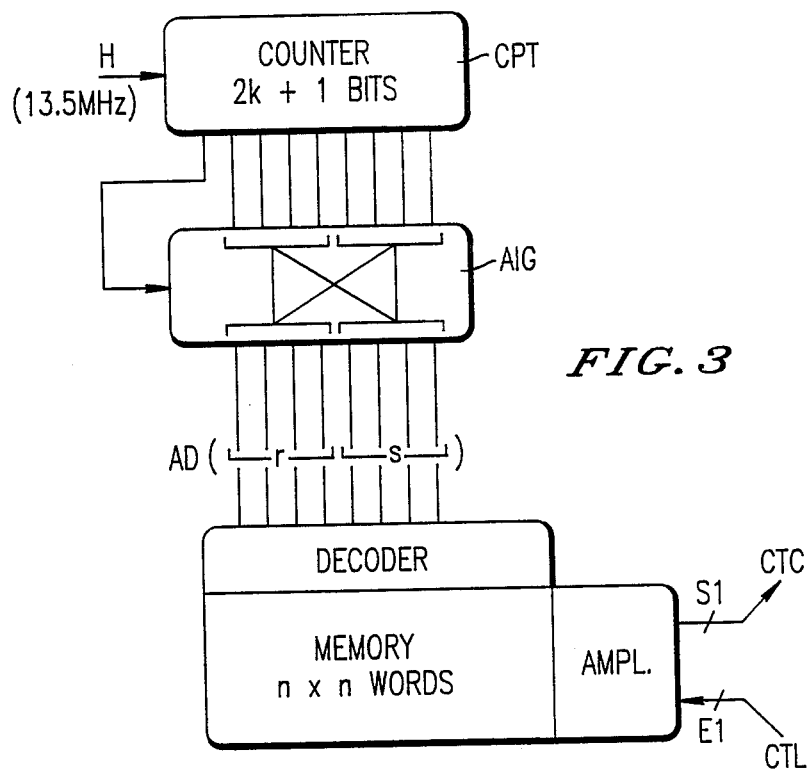
FIG. 3 gives a schematic view of a part of the addressing sequencer used for alternating row-by-row addressing with column-by-column addressing.

The constitution of the circuit used to give the successive addresses of the memory is extremely simple. It can be seen in FIG. 3.

The sequencer comprises essentially a counter CPT with 2k+1 bits for a memory of nxn words with $n=2^k$ The most significant bit output controls a routing switch MUX. This routing switch receives the other 2k bits in two groups of k bits, the first group corresponding to the most significant bits and the second group corresponding to the least significant bits. The routing switch has 2k outputs and, depending on the state of the bit that controls it, it restores at its outputs either the 2k outputs of the counter in their natural order or these 2k outputs crossed, the k most significant bits becoming the k least significant bits and vice versa. The 2k outputs of the routing switch MUX constitute the addresses (r,s) sent to the memory.

The counter is incremented by a clock signal at a frequency H corresponding to the period T for introducing data x(i,j) and giving the results $C^i(v)$.

At every 2k periods T, the sequencing of the addresses is modified.

The reading of a coefficient $C^i(v)$ at an address (r,s) and the writing of another coefficient at the same address can be done differently depending on the types of memories used and, especially, depending on whether the input and output buses E2 and S2 of the memory are formed by two separate buses or by a single, multiplexed bus.

If a single bus is used, the reading of a word should be completely done and finished before the writing of another word begins. Hence, the sum of the stages from the read stage to the write stage should be contained in the period T. Broadly speaking, the read operation should take place during a half period (for example 37 ns) and the write operation should take place during the next half period). Since the read and write operations are themselves sometimes divided into sub-stages (for pre-loading and reading or writing itself) there should be a T/2 period clock available.

If the input and output buses are clearly separated, a partial overlapping of the read and write stages is possible.

Figure 4:
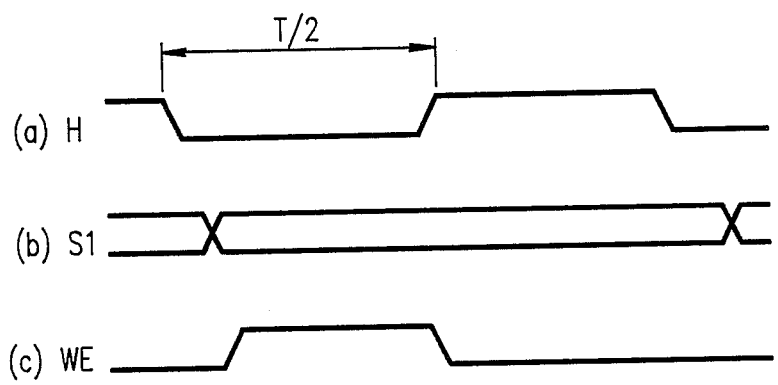
FIGS. 4 is a timing chart of the read-and-write signals of one word of the memory.

The stages may be those shown in FIG. 4.

The line a represents a 13.5 Mhz clock signal H with a half period of T/2=37 ns.

The descending edge defines the triggering of the read stage. An address (r,s) is assumed to be present since the previous rising edge.

The line b represents the output bus S1: the data read appears about 10 nanoseconds after the descending edge of H. This data remains blocked in the bus S1 up to the next descending edge. This data will be actually inserted into the circuit CTC only during the second clock period.

The line c represents a write enable signal WE. This signal defines the moment during which the data to be written, present at the bus E1 after the descending edge of the clock H, is carried over to the bit lines of the memory. The signal WE may be activated by the appearance of data read on the bus S1 and de-activated by the rising edge of the clock H.

What is claimed is:

1. An integrated circuit for the digital processing of signals that transforms input signals, representing a matrix of digital values where i is a row index and j is a column index of the matrix, to produce output signals representing coefficients C(u,v) by a double addition, having the form:

$$C(u,u) = \sum_{i=0}^{i=n-1} C^i(v)g(i,u)$$

with $$C^{[C]i}(v) = \sum_{j=0}^{j=n-1} \times (i,j)f(j,v)$$

n is an integer value greater than 0 representing n x n matrix of digital values;
f is an assignment row coefficient for row i;
g is a column assigned coefficient of the column v;
said circuit comprising:
a first adding circuit, capable of receiving the signals representing the digital values x(i,j) and of producing signals representing the coefficient values $C^i(v)$;
a buffer memory capable of recording said produced signals and then restoring them, the addressing of this memory being organized in n rows and n column;
a second adding circuit capable of receiving, in succession, the signals representing said values $C^i(v)$ and producing signals represting the values C(u,v);
a sequencer to address the memory, to give the memory successive addresses of said value $C^i(v)$ to be recorded, coming from the first adding circuit, or to be restored to the second adding circuit;
wherein the sequencer alternately gives a sequence of nxn addresses, row by row, then a sequence of nxn addresses, column by column, with a read operation followed by a write operation being performed for each address given by the sequencer.

2. An integrated circuit according to the claim 1 wherein the memory comprises an input bus E1 and an output bus S1 which are distinct from each other.

3. An integrated circuit according to the claim 1 wherein said addressing sequencer comprises a 2k+1 bit counter providing an output signal, the most significant bit output of which controls a routing switch circuit, the remaining 2k bits being divided into a group of k most significant bits and another group of k least significant bits, the routing switch circuit being capable of transmitting, depending on the state of the bit that controls it, either the two groups as they appear at the output of the counter or a permutation of said two groups.

4. An integrated circuit according to the claim 1 wherein the memory is a static memory.

* * * * *